3 Sheets--Sheet 3.

J. RAYNEY & W. CAIRNS.
Bakers' Ovens.

No. 136,546. Patented March 4, 1873.

Witnesses
Lucius W. How
Jas. F. Wightman

Inventor
John Rayney
William Cairns
By Thos. P. How
Atty

UNITED STATES PATENT OFFICE.

JOHN RAYNEY, OF BROOKLYN, NEW YORK, AND WILLIAM CAIRNS, OF JERSEY CITY, NEW JERSEY, ASSIGNORS TO JOHN RAYNEY, OF BROOKLYN, NEW YORK.

IMPROVEMENT IN BAKERS' OVENS.

Specification forming part of Letters Patent No. 136,546, dated March 4, 1873.

*To all whom it may concern:*

Be it known that we, JOHN RAYNEY, of Brooklyn, in the county of Kings and State of New York, and WILLIAM CAIRNS, of Jersey City, in the county of Hudson and State of New Jersey, have invented certain Improvements in Bakers' Ovens, of which the following is a specification:

Nature and Objects of the Invention.

This invention relates to that class of ovens in which the position in the oven of the bread or other food to be baked is changed by mechanical means; and the said invention is designed to secure a certain and positive security of the shelves upon which the bread is placed from being overthrown or thrown out of a level position, which would allow the bread or other articles placed thereon to slide off. Said invention consists in the combination, with the shelves on which the articles to be baked are placed, of a revolving shaft and gearing, in the manner hereinafter described, by which the said shelves are always kept in a level position, not liable to be disarranged, as hereinafter more fully set forth.

Description of the Accompanying Drawing.

Figure 1:
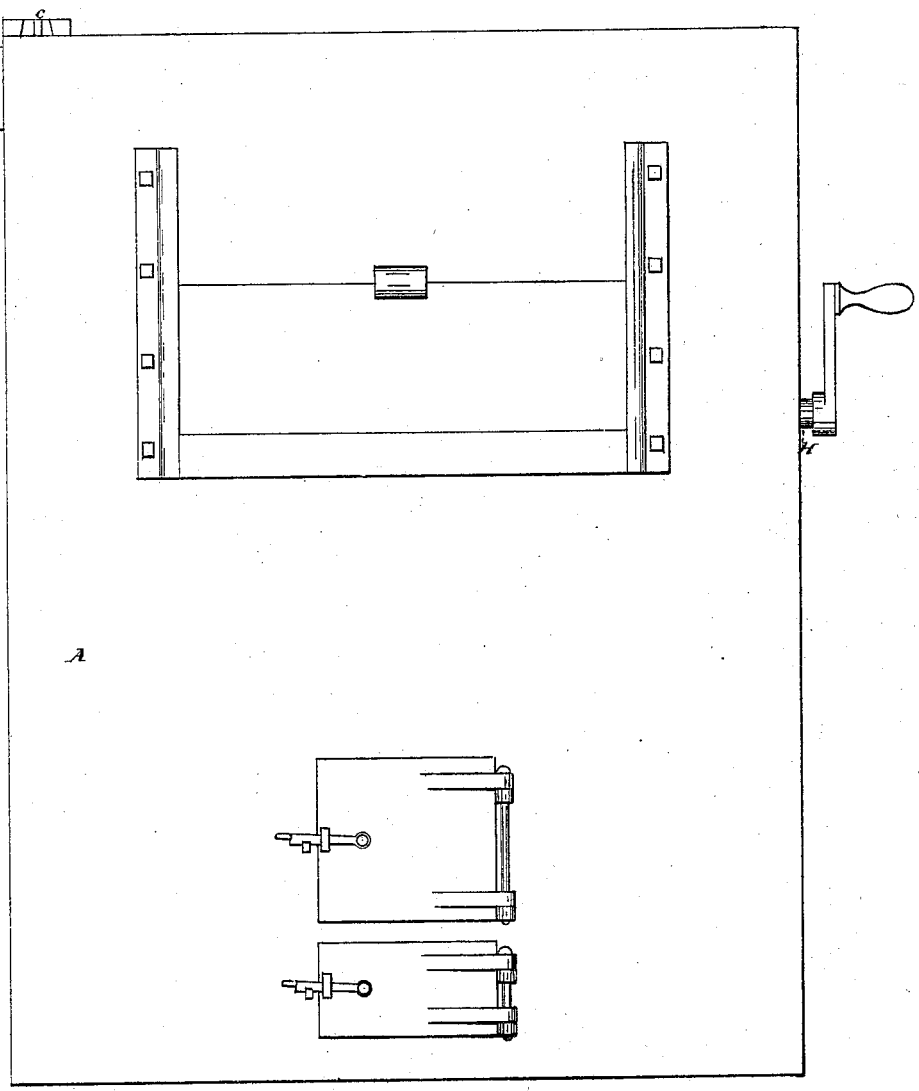
Figure 2:
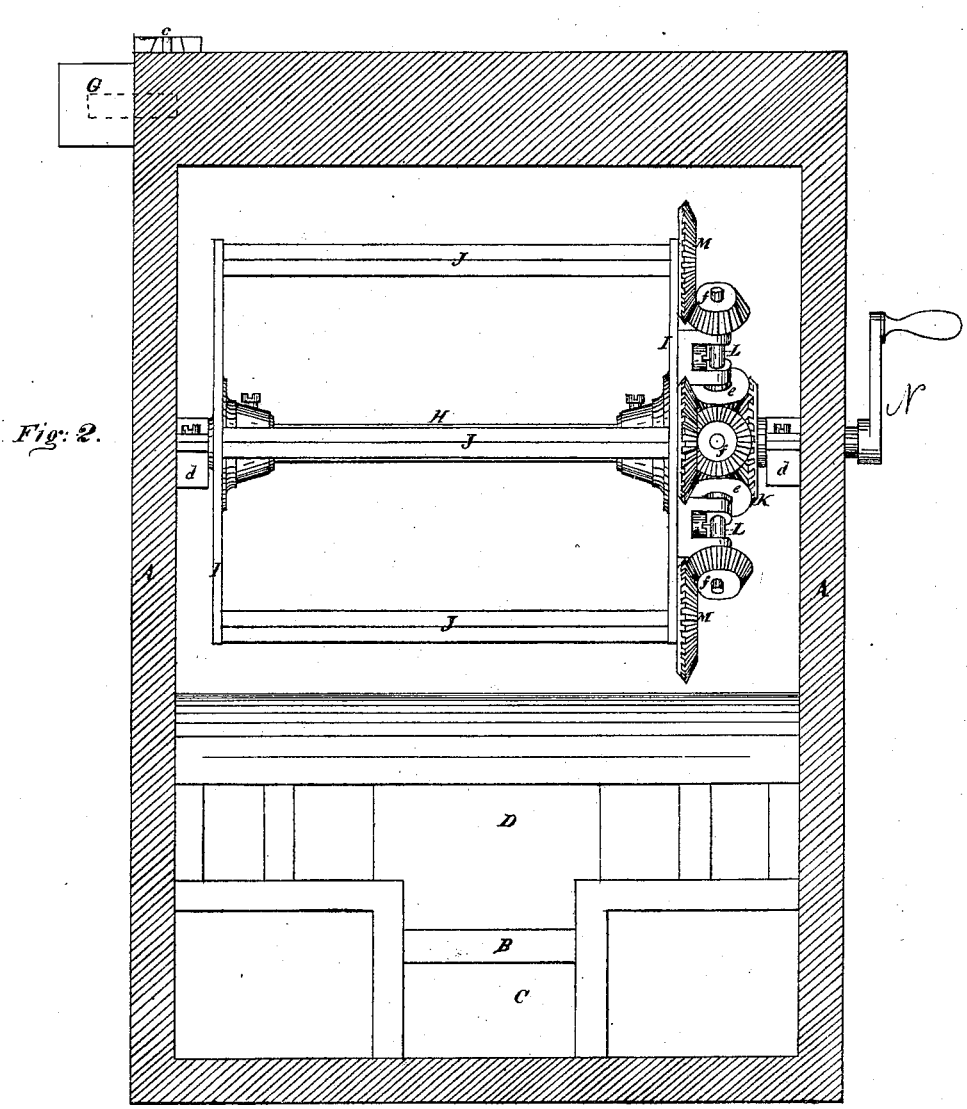
Figure 3:
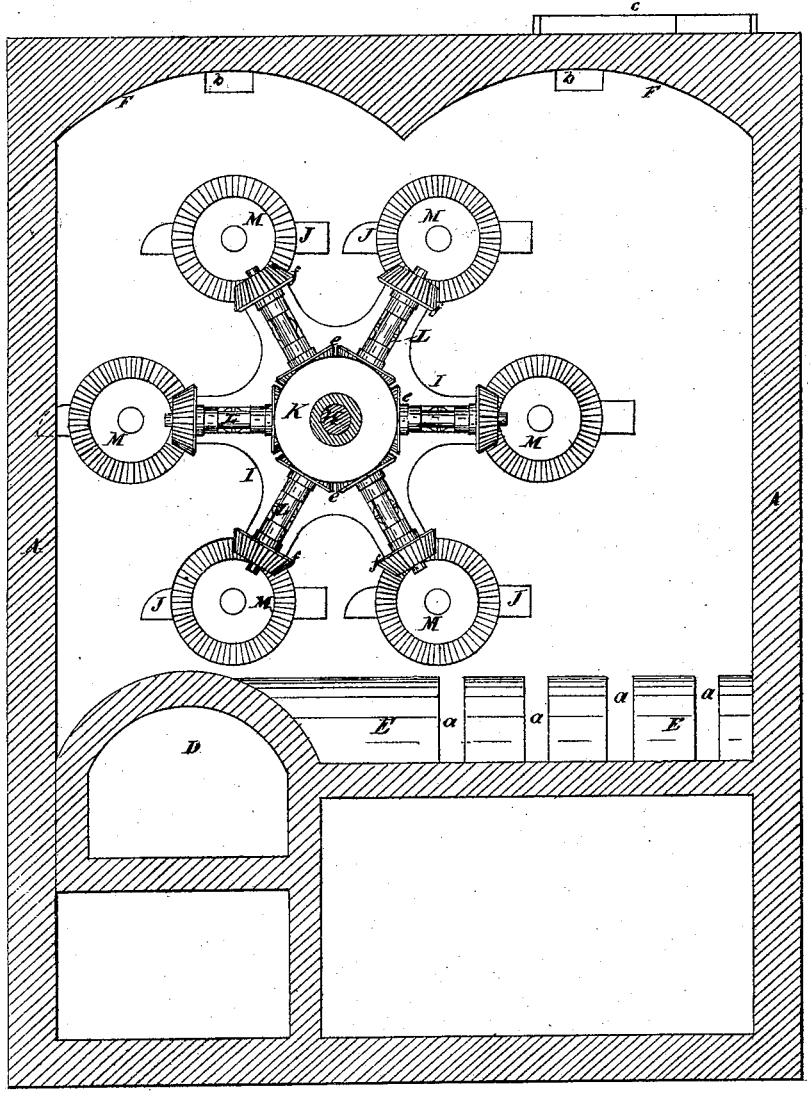

Figure 1 is a front elevation of an oven constructed according our invention. Fig. 2 is an elevation of the same on a plane parallel to Fig. 1, the front wall being, in this view, removed to give a clear view of the internal mechanism. Fig. 3 is a vertical section of the same on a plane at right angles to Figs. 1 and 2.

General Description.

A is the outside wall of the oven, which should be built of brick or other suitable material. The lower part of the oven is provided with a fire-grate, B, and ash-pit C, a combustion-chamber, D, and two arches, E E, for distributing the heat, with openings at $a\ a$ to allow the heated products of combustion to pass into the oven at different points, so as to properly distribute the heat in the oven to the articles subjected to the baking process. The upper part of the oven or baking-chamber is formed with two arches, F F, as shown in Fig. 3, for the purpose of bringing the top of the baking-chamber down as near as practicable to the shelves which carry the articles to be baked; and the middle of the top of the oven, where these arches meet, should be sustained by a cast-iron girder extending along the middle of the top of the oven over the line of meeting of the arches, and either built in at the place where these arches meet, or else laid upon the top and the arches fastened to it by bolts. This girder is not shown in the drawing. Any other means, however, of sustaining these arches over the middle of the oven that are adapted to the purpose may be adopted. The products of combustion are allowed to pass out of the oven through flues $b\ b$, shown in Fig. 3, into the main flue G, shown in Figs. 1 and 2, and thence into a chimney. $c$ is a damper for regulating the heat of the oven, which damper may be opened when the heat is too intense in the back side of the oven, so as to divert the draft to the flue in the forward arch. H is a shaft extending from side to side of the oven, and supported in pillow-blocks $d\ d$ attached to the said sides. This shaft H is provided with arms I, in which the shelves J are hung by journals at their ends. These shelves J are designed to support the bread, crackers, or other substance to be baked during the process of baking, and are made to retain a horizontal position during the revolution of the shaft H by means of a fixed bevel-wheel, K, bevel-pinions $e$ and $f$ on the short shafts L, and the bevel-wheels M on one end of each of the journals of the shelves J.

The bevel-wheel K is so attached to the pillow-block that it cannot revolve, but remains stationary while shaft H is being revolved; and, such being the case, it is obvious that the shelves J cannot be tilted out of a horizontal position by any accident in handling in removing or supplying the articles or substances to be baked, an accident which is liable to occur when what is known as swinging bread-holders are used.

The shaft H may be turned, when necessary to change the position of the bread or other article being baked in the oven, by means of the crank N, or any other suitable device.

Claim.

We claim as our invention—

The combination of the shaft H, fixed wheel K, pinions $e$ and $f$, shafts L, wheels M, and shelves J, substantially as hereinbefore set forth.

JOHN RAYNEY.
WM. CAIRNS.

Witnesses:
    Thos. P. How,
    Lucius W. How.